US009458932B2

United States Patent
Cho et al.

(10) Patent No.: US 9,458,932 B2
(45) Date of Patent: Oct. 4, 2016

(54) SHIFT CONTROL METHOD FOR VEHICLE WITH DCT

(71) Applicants: Hyundai Motor Company, Seoul (KR); Kia Motors Corp., Seoul (KR)

(72) Inventors: Sung Hyun Cho, Yongin-si (KR); Sang Mo Ha, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/740,730

(22) Filed: Jun. 16, 2015

(65) Prior Publication Data

US 2016/0138713 A1   May 19, 2016

(30) Foreign Application Priority Data

Nov. 14, 2014  (KR) .......................... 10-2014-0159212

(51) Int. Cl.
| | |
|---|---|
| *B60W 10/02* | (2006.01) |
| *B60W 10/06* | (2006.01) |
| *F16H 63/46* | (2006.01) |
| *F16D 48/06* | (2006.01) |

(52) U.S. Cl.
CPC ............... *F16H 63/46* (2013.01); *F16D 48/06* (2013.01)

(58) Field of Classification Search
None
See application file for complete search history.

(56) References Cited

U.S. PATENT DOCUMENTS

| | | | | |
|---|---|---|---|---|
| 2005/0064987 | A1* | 3/2005 | Budal ................... | B60K 28/16 477/3 |
| 2014/0136066 | A1* | 5/2014 | Cho ....................... | F16D 48/06 701/68 |
| 2014/0195131 | A1* | 7/2014 | Porto .................... | F16H 61/688 701/60 |

FOREIGN PATENT DOCUMENTS

| | | |
|---|---|---|
| JP | 2009-257408 A | 11/2009 |
| JP | 2013-057374 A | 3/2013 |
| KR | 10-2004-0075766 A | 8/2004 |
| KR | 10-2014-0034548 A | 3/2014 |

* cited by examiner

*Primary Examiner* — Edwin A Young
(74) *Attorney, Agent, or Firm* — Morgan, Lewis & Bockius LLP

(57) ABSTRACT

A shift control method for a vehicle with a Dual Clutch Transmission (DCT) may include determining whether power-on up-shifting has been initiated, performing torque handover control by controlling release-side and engage-side clutches by repeatedly calculating control torques of the release-side clutch and the engage-side clutch over time, when the power-on up-shifting is started and a torque handover period is entered, determining whether tip-out is generated during the performing of torque handover control, obtaining a remaining updating time by recalculating a remaining time until the end of the torque handover period in accordance with a decrease in engine torque, when it is determined that tip-out has been generated, and controlling the release-side and the engage-side clutches on the basis of the control torques for the release-side and the engage-side clutches that are made different in accordance with the calculated remaining updating time during a remaining torque handover period.

7 Claims, 2 Drawing Sheets

SHIFT CONTROL METHOD FOR VEHICLE WITH DCT

CROSS REFERENCE TO RELATED APPLICATION

The present application claims priority to Korean Patent Application Number 10-2014-0159212 filed Nov. 14, 2014, the entire contents of which is incorporated herein for all purposes by this reference.

BACKGROUND OF THE INVENTION

1. Field of the Invention

The present invention generally relates to a shift control method for a vehicle with a DCT, and, more particularly, to a shift control method when a driver releases an accelerator pedal while shifting to an upper gear with the accelerator pedal pressed down.

2. Description of Related Art

A DCT (Dual Clutch Transmission) is a device that uses a synchro-mesh type of shifting mechanism, which is used in the existing manual transmissions; receives power through different input shafts with two clutches; and automatically shifts.

A DCT has no specific part for absorbing a shock that may be generated in shifting, like the torque converter of the existing automatic transmissions; so it is required to prevent shock and vibration by more accurately controlling shifting for more detailed conditions in automatic shifting.

In tip-out due to a sudden release of an accelerator pedal during power-on up-shifting in which the driver shifts to an upper gear with an accelerator pedal pressed down, engine torque rapidly decreases due to sudden release of the accelerator pedal by the driver, so shock and vibration are generated unless appropriate shift control to account for the rapid torque change is performed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method for a vehicle with a Dual Clutch Transmission (DCT) that can improve the commercial value of a vehicle with a DCT by achieving appropriate shifting without shock and vibration, even if the torque of an engine rapidly decreases due to tip-out due to a sudden release of an accelerator pedal during power-on up-shifting in which the driver shifts to an upper gear with the accelerator pedal pressed down in a vehicle with a DCT.

According to various aspects of the present invention, a shift control method for a vehicle with a DCT may include determining, by a controller, whether power-on up-shifting has been initiated, performing, by the controller, torque handover control by controlling a release-side clutch and an engage-side clutch by repeatedly calculating control torques of the release-side clutch and the engage-side clutch over time, when the power-on up-shifting is started and a torque handover period is entered, determining, by the controller, whether tip-out is generated during the performing of torque handover control, obtaining, by the controller, a remaining updating time by recalculating a remaining time until the end of the torque handover period in accordance with a decrease in engine torque, when it is determined that tip-out has been generated in the determining of whether tip-out is generated, and controlling, by the controller, the release-side clutch and the engage-side clutch on the basis of the control torques for the release-side clutch and the engage-side clutch that are made different in accordance with the calculated remaining updating time during a remaining torque handover period.

In the performing of torque handover control, the control torques of the release-side clutch and the engage-side clutch may be obtained by adding a difference to control torques in a previous control cycle, in which the difference may be obtained by dividing a change in remaining control torque to be changed by a remaining time until the end of the torque handover period, in which the remaining time until the end of the torque handover period may be obtained by subtracting a phase-lapsed time, which is a current elapsed time of the torque handover period from a basic phase objective-time calculated when the torque handover period is first entered, and the change in the remaining control torque may be obtained by subtracting the control torque in the previous control cycle from a basic objective torque calculated when the torque handover period is first entered.

In the controlling of the release-side clutch and the engage-side clutch, the remaining updating time may be obtained by subtracting an updating objective-torque of the release-side clutch from the control torque of the release-side clutch in the previous control cycle and then dividing a result obtained from the subtraction by an inclination of the control torque of the release-side clutch that providing a possibility to prevent a shock due to a decrease in engine torque by tip-out, in which the updating objective-torque is set to prevent a shock due to the decrease in engine torque due to tip-out.

The updating objective-torque may be calculated on a basis of a tendency of a decrease in engine torque due to the tip-out of an engine and a map determined by repeated testing on control torques of the release-side clutch and the engage-side clutch at a level of preventing a shock due to the decrease in the engine torque, and the inclination of the control torque of the release-side clutch that provides a possibility to prevent a shock due to the decrease in the engine torque by the tip-out is calculated from a map determined by repeated testing in accordance with a number of revolutions of the engine and an objective gear to shift to.

The controlling of the release-side clutch and the engage-side clutch may include obtaining a new updating phase objective-time by adding up the remaining updating time calculated in the obtaining of a remaining updating time and the phase-lapsed time that is the current elapsed time of the torque handover period, and comparing the updating phase objective-time calculated in the obtaining of the new updating phase objective-time with the basic phase objective-time calculated when the torque handover period is first entered, in which as the result of the comparing of the updating phase objective-time with the basic phase objective-time, different control torques are obtained for the release-side clutch and the engage-side clutch in accordance with whether the updating phase objective-time is equal to or less than, or whether the updating phase objective-time is more than the basic phase objective-time.

As the result of the comparing of the updating phase objective-time with the basic phase objective-time, when the updating phase objective-time is equal to or less than the basic phase objective-time, the control torques for controlling the release-side clutch and the engage-side clutch may be obtained by adding a difference to the control torques in the previous control cycle, in which the difference is obtained by dividing the change in the remaining control torque to be changed by the remaining time until the end of the torque handover period, in which the remaining time until the end of the torque handover period may be obtained by subtracting the phase-lapsed time that is the current elapsed time of the torque handover period from the updating phase objective-time calculated in the obtaining of a new updating phase objective-time, and the change in the remaining control torque may be obtained by subtracting the control torque in the previous control cycle from the updating objective-torque.

As the result of the comparing of the updating phase objective-time with the basic phase objective-time, when the updating phase objective-time is more than the basic phase objective-time, the control torques for controlling the release-side clutch and the engage-side clutch may be obtained by adding a difference to the control torques in the previous control cycle, in which the difference is obtained by dividing the change in the remaining control torque to be changed by the remaining time until the end of the torque handover period, in which the remaining time until the end of the torque handover period may be obtained by subtracting the phase-lapsed time that is the current elapsed time of the torque handover period from the basic phase objective-time calculated when the torque handover period is first entered, and the change in the remaining control torque may be obtained by subtracting the control torque in the previous control cycle from the updating objective-torque.

According to the present invention, it is possible to improve the commercial value of a vehicle with a DCT by achieving appropriate shifting without shock and vibration, even if the torque of an engine rapidly decreases due to tip-out that is generated when a driver suddenly releases an accelerator pedal during power-on up-shifting in which the driver shifts to an upper gear with the accelerator pedal pressed down in a vehicle with a DCT.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are shown in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
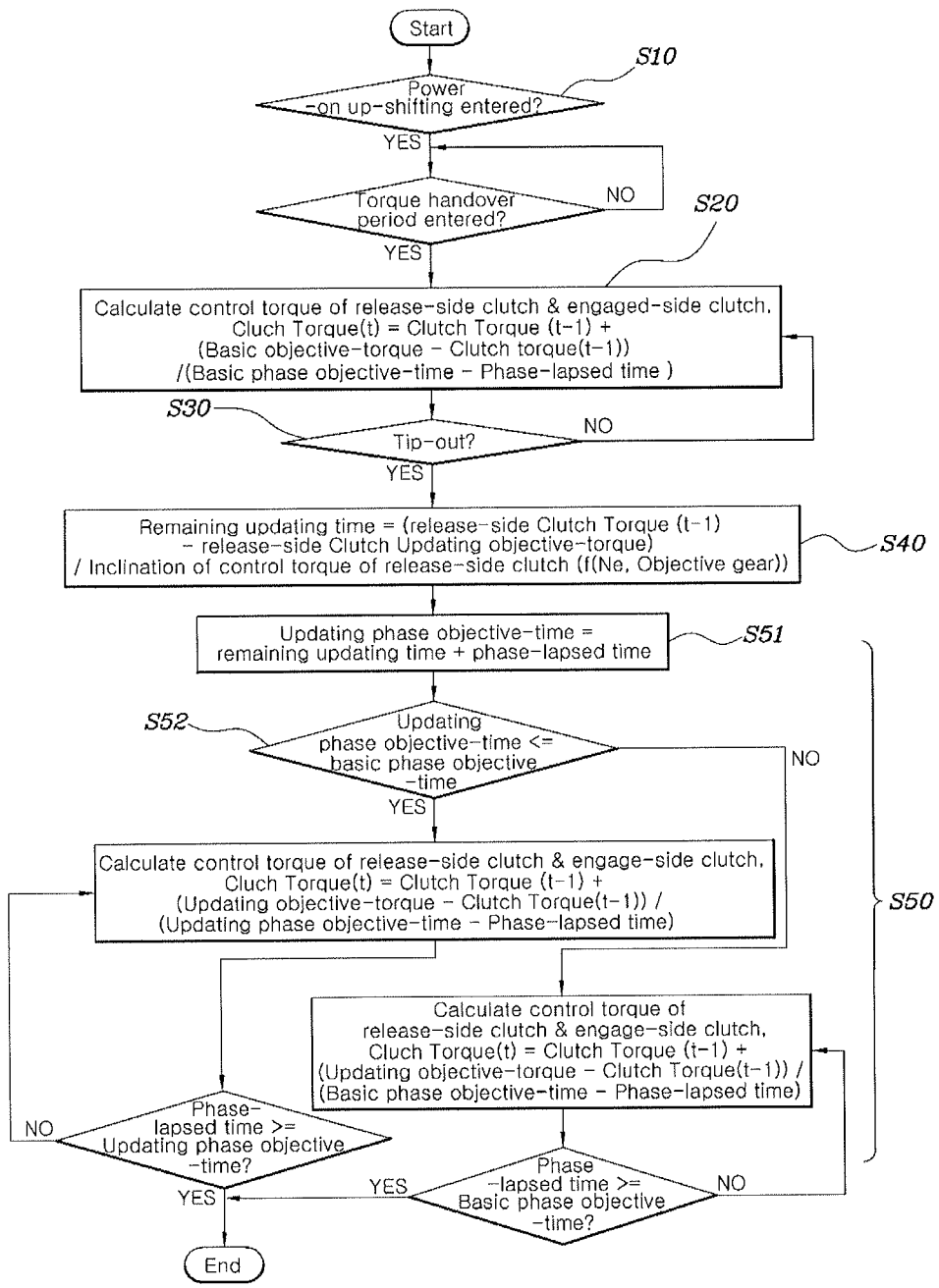
FIG. 1 is a diagram showing an exemplary shift control method for a vehicle with a Dual Clutch Transmission (DCT) according to the present invention.
Figure 2:
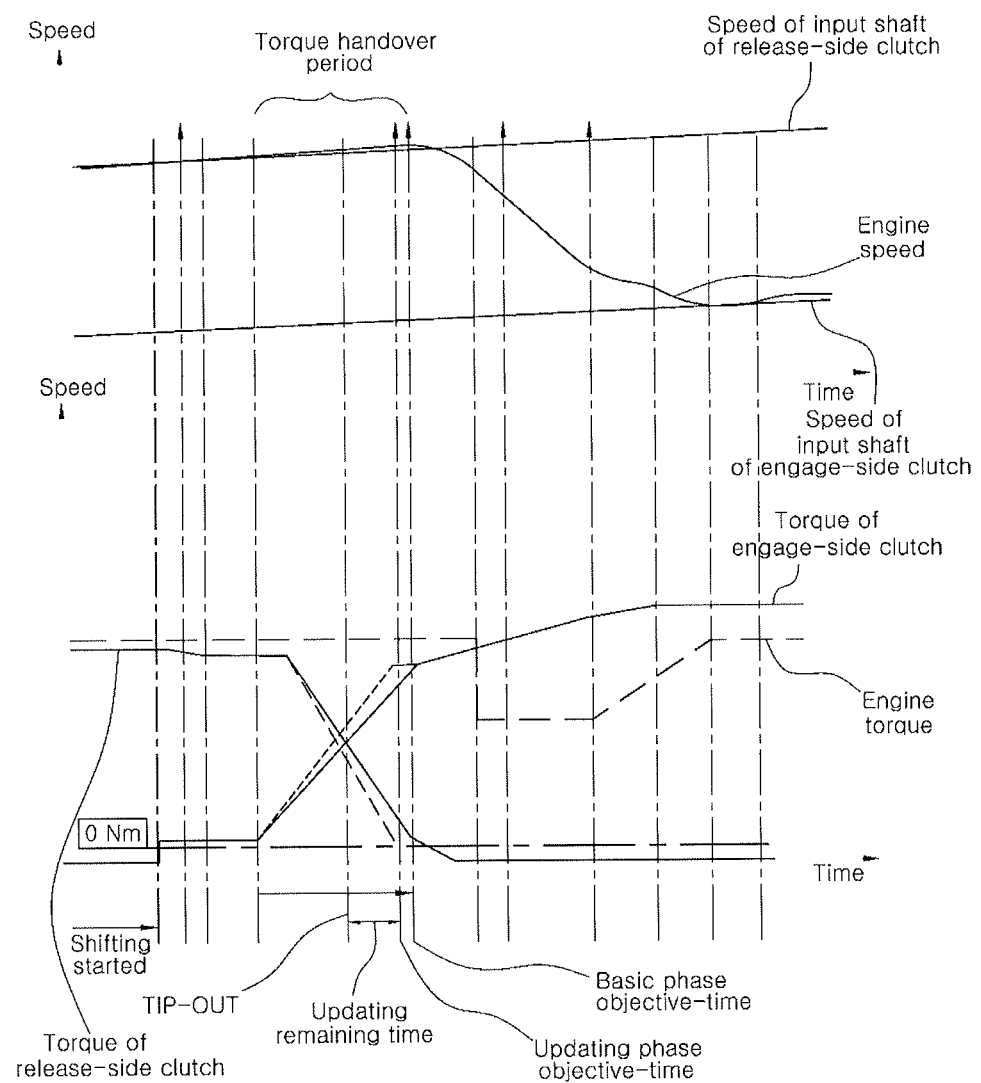
FIG. 2 is a graph illustrating the exemplary shift control method for the vehicle with the DCT according to the present invention.

Referring to FIG. 1 and FIG. 2, a shift control method for a vehicle with a Dual Clutch Transmission (DCT) according to various embodiment of the present invention, the steps performed by a controller, includes determining whether power-on up-shifting has been entered (S10), performing torque handover control by controlling a release-side clutch and an engage-side clutch by repeatedly calculating control torques of the release-side clutch and the engage-side clutch over time, when the power-on up-shifting is started and a torque handover period is entered (S20), determining whether tip-out is generated (S30) during the performing of torque handover control (S20), obtaining a remaining updating time by recalculating the remaining time until the end of the torque handover period in accordance with a decrease in engine torque (S40), when it is determined that tip-out has been generated in the determining of whether tip-out is generated (S30), and controlling the release-side clutch and the engage-side clutch on the basis of the control torques for the release-side clutch and the engage-side clutch that are made different in accordance with the calculated remaining updating time during the remaining torque handover period (S50).

That is, according to various aspects of the present invention, when engine torque rapidly decreases due to tip-out that is generated when a driver takes a foot off an accelerator pedal during torque phase, in which the torque of a release-side clutch decreases and the torque of an engage-side clutch increases, so the torques cross each other, in power-on up-shifting in which the driver shifts to an upper gear with the accelerator pedal pressed down, it is possible to stably finish the shifting without shock and vibration under a sudden situation by obtaining a remaining updating time that is the remaining time of torque phase for finishing the torque phase without shock or vibration on the basis of the decrease in engine torque and by applying different torques to the release-side clutch and the engage-side clutch.

In the performing of torque handover control (S20), the control torques of the release-side clutch and the engage-side clutch are obtained by adding a difference to the control torques in the previous control cycle.

The difference is obtained by dividing a change in remaining control torque to be changed by the remaining time until the end of the torque handover period.

The remaining time until the end of the torque handover period is obtained by subtracting a phase-lapsed time, which is the current elapsed time of the torque handover period from the basic phase objective-time calculated when the torque handover period is first entered, and the change in the remaining control torque is obtained by subtracting the control torque in the previous control cycle from the basic objective torque calculated when the torque handover period is first entered.

That is, a controller designed to control the release-side clutch and the engage-side clutch controls the release-side clutch and the engage-side clutch by repeating a control loop with a predetermined cycle. When the torque phase starts to be controlled, the controller controls the clutches on the basis of new clutch control torques obtained by setting first the basic phase objective-time when the torque phase is supposed to be finished under the current traveling condition of a vehicle, and the basic objective torque that the control torques of the release-side clutch and the engage-side clutch are supposed to reach at the end of the torque phase, and then by adding changes in remaining control torque to the clutch control torque in the previous cycle. Obviously, the control torque is obtained for each of the release-side clutch and the engage-side clutch and then the control is performed.

For reference, the torque handover period means a torque phase and an actual shifting period in which the engine speed is actually changed and synchronized with the speed of the input shaft at the objective gear, that is, the speed of the input shaft of the engage-side clutch.

In the controlling of the release-side clutch and the engage-side clutch (S40), the remaining updating time is obtained by subtracting an updating objective-torque of the release-side clutch from the control torque of the release-side clutch in the previous control cycle and then dividing it by the inclination of the control torque of the release-side clutch that makes it possible to prevent a shock due to a decrease in engine torque by tip-out, and the updating objective-torque is set to prevent a shock due to the decrease in engine torque due to tip-out. In an exemplary embodiment of the present invention, the release clutch inclination of control torque may be a function of Ne (Number of Engine rotation) and objective gear. Accordingly, the release clutch inclination of control torque can be calculated from the Ne and Objective gear.

In detail, the updating objective-torque is calculated on the basis of the tendency of a decrease in engine torque due to tip-out of an engine and a map determined by repeated testing on control torques of the release-side clutch and the engage-side clutch at the level of preventing a shock due to the decrease in engine torque.

Further, the inclination of the control torque of the release-side clutch that makes it possible to prevent a shock due to a decrease in engine torque by the tip-out is calculated from a map determined by repeated testing in accordance with the number of revolutions of the engine and the objective gear to shift to.

That is, the remaining updating time in the obtaining of a remaining updating time (S40) means the remaining time until the end of a new torque phase considering the engine torque that rapidly decreases due to tip-out by a driver, and the fact that shock and vibration can be prevented when a torque phase is completed within this time has been experimentally verified.

The controlling of the release-side clutch and the engage-side clutch (S50) includes obtaining a new updating phase objective-time (S51) by adding up the remaining updating time calculated in the obtaining of a remaining updating time (S40) and the phase-lapsed time that is the current elapsed time of the torque handover period and comparing the updating phase objective-time calculated in the obtaining of a new updating phase objective-time (S51) with the basic phase objective-time calculated when the torque handover period is first entered (S52).

As the result of the comparing of the updating phase objective-time with the basic phase objective-time (S52), different control torques are obtained for the release-side clutch and the engage-side clutch in accordance with whether the updating phase objective-time is equal to or less than, or more than the basic phase objective-time.

That is, as the result of the comparing of the updating phase objective-time with the basic phase objective-time (S52), when the updating phase objective-time is equal to or less than the basic phase objective-time, the control torques for controlling the release-side clutch and the engage-side clutch are obtained by adding a difference to the control torques in the previous control cycle and the difference is obtained by dividing the change in the remaining control torque to be changed by the remaining time until the end of the torque handover period.

The remaining time until the end of the torque handover period is obtained by subtracting the phase-lapsed time that is the current elapsed time of the torque handover period from the updating phase objective-time calculated in the obtaining of a new updating phase objective-time (S51), and the change in the remaining control torque is obtained by subtracting the control torque in the previous control cycle from the updating objective-torque.

The remaining torque phase is finished while the release-side clutch and the engage-side clutch are controlled on the basis of the control torque obtained as described above, in which the control torques are repeatedly obtained until the phase-lapsed time reaches the updating phase objective-time.

As the result of the comparing of the updating phase objective-time with the basic phase objective-time (S52), when the updating phase objective-time is more than the basic phase objective-time, the control torques for controlling the release-side clutch and the engage-side clutch are obtained by adding a difference to the control torques in the previous control cycle and the difference is obtained by dividing the change in the remaining control torque to be changed by the remaining time until the end of the torque handover period.

The remaining time until the end of the torque handover period is obtained by subtracting the phase-lapsed time that is the current elapsed time of the torque handover period from the basic phase objective-time calculated when the torque handover period is first entered, and the change in the remaining control torque is obtained by subtracting the control torque in the previous control cycle from the updating objective-torque.

In this case, similarly, the remaining torque phase is finished while the release-side clutch and the engage-side clutch are controlled on the basis of the control torque obtained as described above, in which the control torques are repeatedly obtained until the phase-lapsed time reaches the basic phase objective-time.

As described above, by obtaining the remaining updating time on the basis of engine torque decreased due to tip-out by a driver, by comparing the updating phase objective-time with the basic phase objective-time on the basis of the remaining updating time, and by using different control torques to control the release-side clutch and the engage-side clutch, shifting is stably performed without shock and vibration even under tip-out, so it is possible to improve the commercial value of a vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for a vehicle with a Dual Clutch Transmission (DCT), comprising:
   determining, by a controller, whether power-on up-shifting has been initiated;
   performing, by the controller, torque handover control by controlling a release-side clutch and an engage-side clutch by repeatedly calculating control torques of the release-side clutch and the engage-side clutch over time, when the power-on up-shifting is started and a torque handover period is entered;
   determining, by the controller, whether tip-out is generated during the performing of torque handover control;
   obtaining, by the controller, a remaining updating time by recalculating a remaining time until an end of the torque handover period in accordance with a decrease in engine torque, when the tip-out is determined to have been generated in the determining of whether the tip-out is generated; and
   controlling, by the controller, the release-side clutch and the engage-side clutch on a basis of the control torques for the release-side clutch and the engage-side clutch that are made different in accordance with the calculated remaining updating time during a remaining torque handover period.

2. The method of claim 1, wherein in the performing of torque handover control, the control torques of the release-side clutch and the engage-side clutch are obtained by adding a difference to control torques in a previous control cycle,
   wherein the difference is obtained by dividing a change in remaining control torque to be changed by a remaining time until the end of the torque handover period,
   wherein the remaining time until the end of the torque handover period is obtained by subtracting a phase-lapsed time, which is a current elapsed time of the torque handover period from a basic phase objective-time calculated when the torque handover period is first entered, and
   wherein the change in the remaining control torque is obtained by subtracting the control torque in the previous control cycle from a basic objective torque calculated when the torque handover period is first entered.

3. The method of claim 2, wherein in the controlling of the release-side clutch and the engage-side clutch, the remaining updating time is obtained by subtracting an updating objective-torque of the release-side clutch from the control torque of the release-side clutch in the previous control cycle and then dividing a result obtained from the subtraction by an inclination of the control torque of the release-side clutch that provides a possibility to prevent a shock due to a decrease in engine torque by tip-out,
   wherein the updating objective-torque is set to prevent the shock due to the decrease in the engine torque due to the tip-out.

4. The method of claim 3, wherein the updating objective-torque is calculated on a basis of a tendency of a decrease in engine torque due to the tip-out of an engine and a map determined by repeated testing on control torques of the release-side clutch and the engage-side clutch at a level of preventing the shock due to the decrease in the engine torque, and
   the inclination of the control torque of the release-side clutch that provides a possibility to prevent the shock due to the decrease in the engine torque by the tip-out is calculated from a map determined by repeated testing in accordance with a number of revolutions of the engine and an objective gear to shift to.

5. The method of claim 2, wherein the controlling of the release-side clutch and the engage-side clutch includes:
   obtaining a new updating phase objective-time by adding up the remaining updating time calculated in the obtaining of a remaining updating time and the phase-lapsed time that is the current elapsed time of the torque handover period; and
   comparing the updating phase objective-time calculated in the obtaining of the new updating phase objective-time with the basic phase objective-time calculated when the torque handover period is first entered,
   wherein as the result of the comparing of the updating phase objective-time with the basic phase objective-time, different control torques are obtained for the release-side clutch and the engage-side clutch in accordance with whether the updating phase objective-time is equal to or less than, or whether the updating phase objective-time is more than the basic phase objective-time.

6. The method of claim 5, wherein as the result of the comparing of the updating phase objective-time with the basic phase objective-time, when the updating phase objective-time is equal to or less than the basic phase objective-time,
   the control torques for controlling the release-side clutch and the engage-side clutch are obtained by adding a difference to the control torques in the previous control cycle, wherein
   the difference is obtained by dividing the change in the remaining control torque to be changed by the remaining time until the end of the torque handover period, wherein
   the remaining time until the end of the torque handover period is obtained by subtracting the phase-lapsed time that is the current elapsed time of the torque handover period from the updating phase objective-time calculated in the obtaining of a new updating phase objective-time, and
   the change in the remaining control torque is obtained by subtracting the control torque in the previous control cycle from the updating objective-torque.

7. The method of claim 5, wherein as the result of the comparing of the updating phase objective-time with the basic phase objective-time, when the updating phase objective-time is more than the basic phase objective-time, the control torques for controlling the release-side clutch and the engage-side clutch are obtained by adding a difference to the control torques in the previous control cycle, wherein the difference is obtained by dividing the change in the remaining control torque to be changed by the remaining time until the end of the torque handover period, wherein the remaining time until the end of the torque handover period is obtained by subtracting the phase-lapsed time that is the current elapsed time of the torque handover period from the basic phase objective-time calculated when the torque handover period is first entered, and the change in the remaining control torque is obtained by subtracting the control torque in the previous control cycle from the updating objective-torque.

* * * * *